(12) United States Patent
Kato

(10) Patent No.: US 6,335,827 B2
(45) Date of Patent: Jan. 1, 2002

(54) REAL IMAGE MODE VARIABLE MAGNIFICATION FINDER

(75) Inventor: Shigeru Kato, Tachikawa (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/866,931

(22) Filed: May 30, 2001

Related U.S. Application Data

(62) Division of application No. 09/087,964, filed on Jun. 1, 1998, now Pat. No. 6,256,144.

(30) Foreign Application Priority Data

Jun. 2, 1997 (JP) ............................................... 9-144162

(51) Int. Cl.[7] .......................... G03B 13/06; G02B 15/14
(52) U.S. Cl. ...................... 359/432; 359/431; 359/676; 359/686
(58) Field of Search .................... 359/362, 420–422, 359/431–433, 676–686; 396/373–386

(56) References Cited

U.S. PATENT DOCUMENTS

| | | | |
|---|---|---|---|
| 5,005,955 A | 4/1991 | Ohshita | ...................... 359/422 |
| 5,086,353 A | 2/1992 | Mukai et al. | ............... 359/432 |
| 5,231,534 A | 7/1993 | Kato | |
| 5,323,264 A | 6/1994 | Kato | ........................... 359/431 |
| 5,581,400 A | 12/1996 | Takase et al. | ................ 359/431 |
| 5,701,199 A | 12/1997 | Takato | ......................... 359/432 |
| 5,721,638 A | 2/1998 | Kim | ........................... 359/432 |
| 5,801,882 A | 9/1998 | Miyauchi | ..................... 359/431 |

FOREIGN PATENT DOCUMENTS

| | | |
|---|---|---|
| JP | 1-257817 | 10/1989 |
| JP | 4-51108 | 2/1992 |
| JP | 4-56814 | 2/1992 |
| JP | 5-53054 | 3/1993 |
| JP | 7-84148 | 3/1996 |
| JP | 9-68739 | 3/1997 |

*Primary Examiner*—Thong Nguyen
(74) *Attorney, Agent, or Firm*—Pillsbury Winthrop LLP

(57) ABSTRACT

A real image mode variable magnification finder has an objective optical system with positive refracting power, an image erecting optical system, and an ocular optical system with positive refracting power. The objective optical system has a first lens unit with negative refracting power, a second lens unit with negative refracting power, a third lens unit with positive refracting power, and a fourth lens unit with negative refracting power. When the magnification of the finder is changed, a plurality of lens units including the third lens unit are moved. In this way, the total length of the objective optical system can be reduced, and thus a compact finder is obtained.

13 Claims, 5 Drawing Sheets

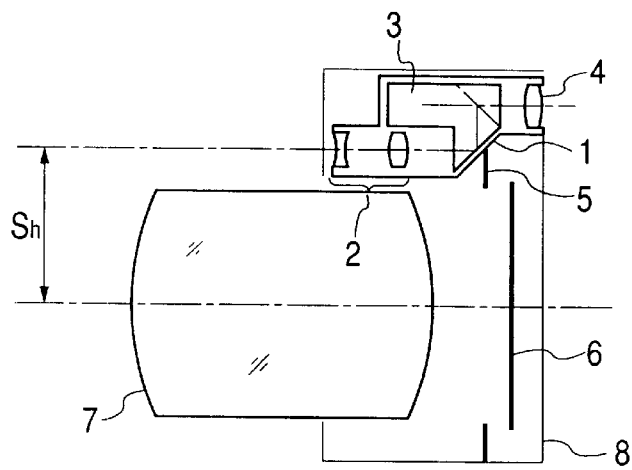
FIG. 1A
PRIOR ART
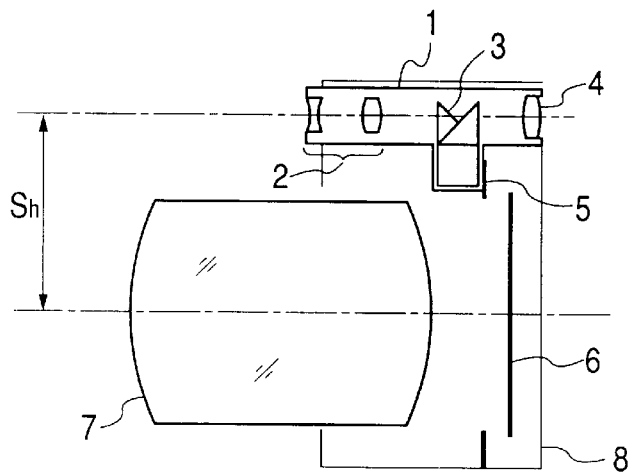
FIG. 1B
PRIOR ART
FIG. 2
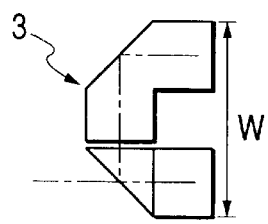
FIG. 4
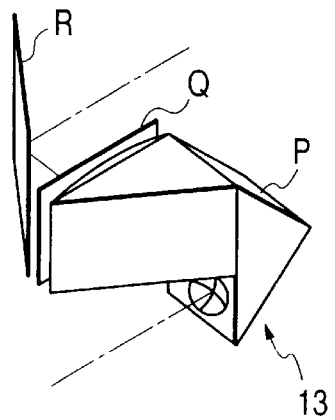

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

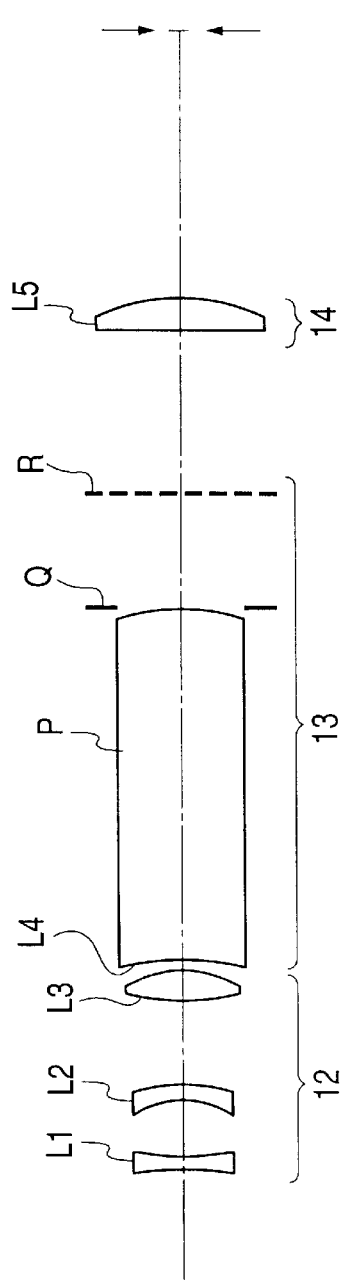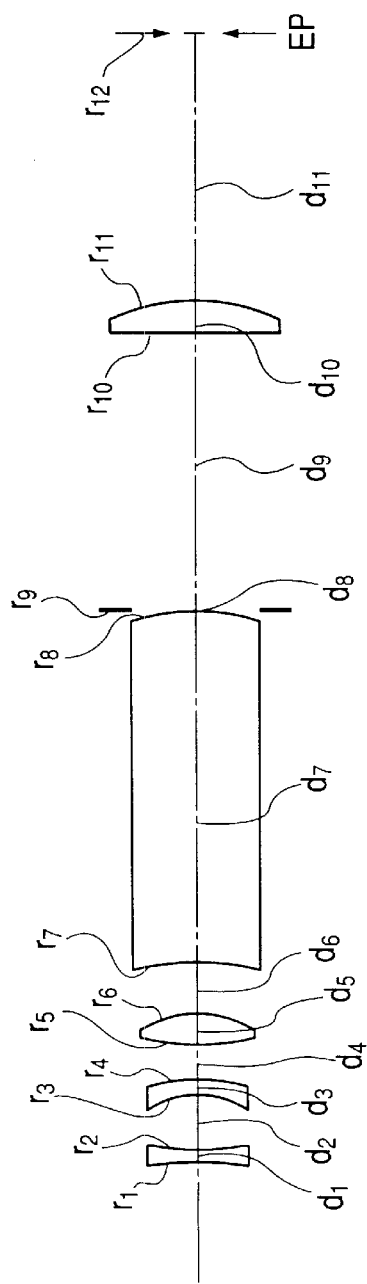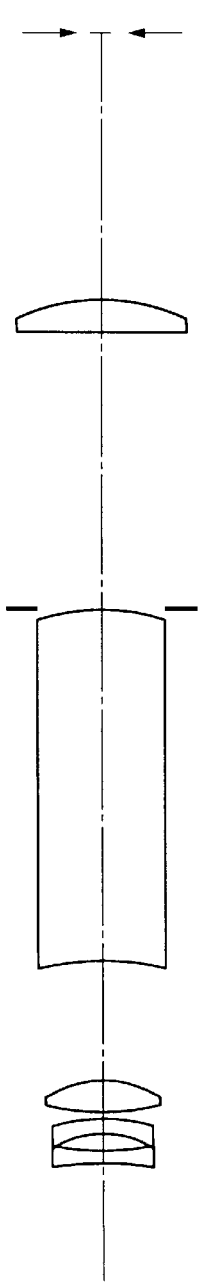
FIG. 8A
FIG. 8B
FIG. 8C

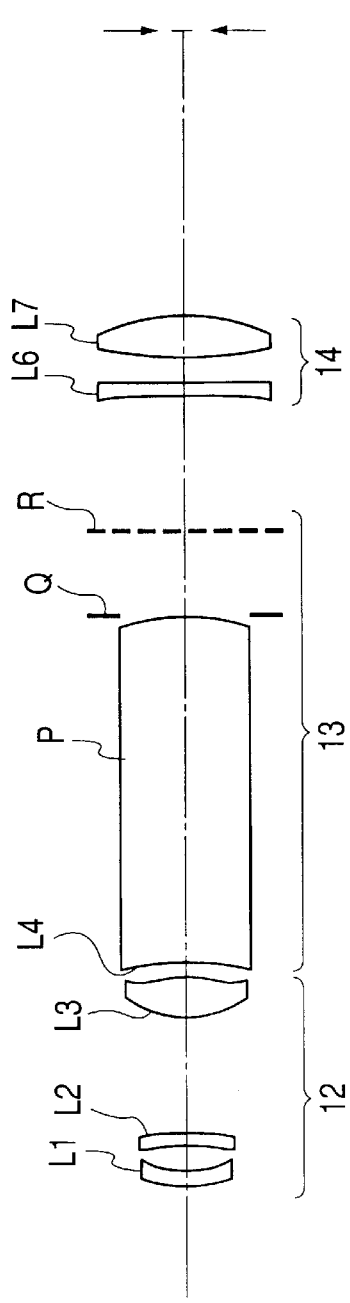
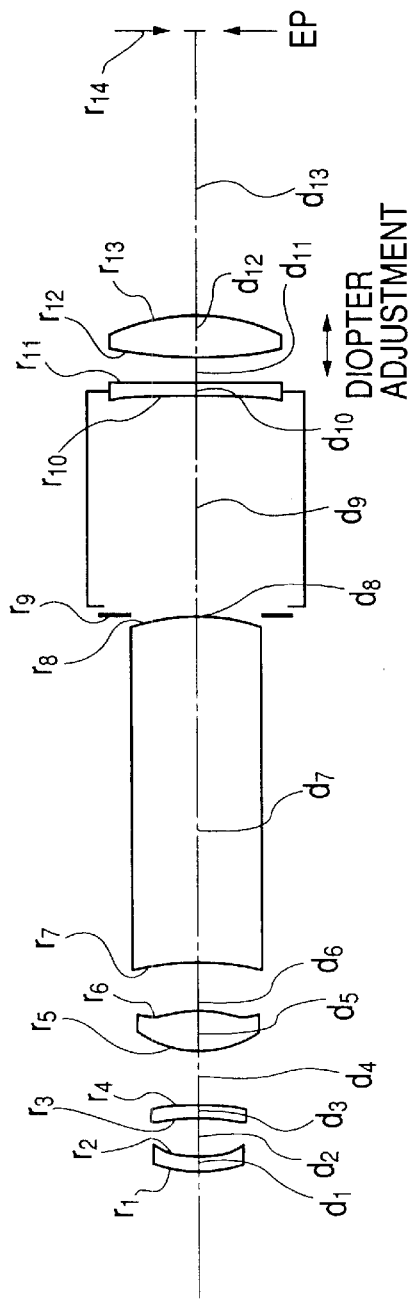
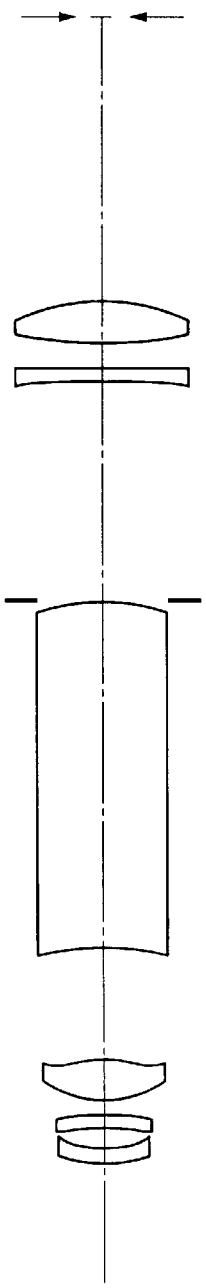
FIG. 9A
FIG. 9B
FIG. 9C

REAL IMAGE MODE VARIABLE MAGNIFICATION FINDER

This is a Divisional of application Ser. No. 09/087,964, filed Jun. 1, 1998 now U.S. Pat. No. 6,256,144, the entire contents of which are incorporated herein by reference.

BACKGROUND OF THE INVENTION

1. Field of the Invention

This invention relates to a real image mode variable magnification finder for attachment which is constructed to be independent of a photographing optical system as in a still camera or a video camera.

2. Description of Related Art

Real image mode variable magnification finders have been designed so that an intermediate image is formed inside an image erecting system to reduce the total length of an objective unit. As an example, a design is known that a Porro prism is divided into two pieces. When this design is used, as shown in FIG. 1A, the entrance window of an objective optical system 2, in contrast with FIG. 1B, can be located at a position lower than the window of an eyepiece 4. Thus, a shift $S_h$ of the objective optical system 2 from the optical axis can be diminished to keep parallax with a photographic lens 7 to a minimum. In particular, it is known that a prism such that light from the objective optical system 2 is reflected upward and then back minimizes interference with a film mask 5 of a camera and is most suitable for use in reducing the thickness of the camera. Also, in FIGS. 1A and 1B, reference numeral 1 represents a finder unit; 3, a Porro prism; 6, a film; and 8, a camera case.

As will be obvious from Japanese Patent Preliminary Publication Nos. Hei 7-84184 and Hei 9-68739, it is known that, in order to place a mechanism member for changing the size of a field frame, the field frame is placed above the side face of an objective optical system including a prism, after light is reflected three times by the prism, and thereby space for the mechanism member can be provided.

Further, as set forth in Japanese Patent Preliminary Publication No. Hei 5-53054, it is known that, in order to increase the optical path length of the back focus section of the objective optical system, it is only necessary to use a prism whose entrance surface is concave.

In addition, as disclosed in Japanese Patent Preliminary Publication No. Hei 1-257817, a technique is known that, in a real image mode finder using a Porro mirror in an image erecting optical system, an eyepiece is fixed to a frame to prevent dirt particles from penetrating into an intermediate image, providing an enclosed structure.

However, each of Hei 7-84184, Hei 5-53054, and Hei 9-68739 which are mentioned above has the problem that the adhesion of dirt particles to a field lens located on the pupil side of the intermediate image cannot be prevented because the eyepiece is movable for diopter adjustment.

Japanese Patent Preliminary Publication No. Hei 4-51108 is capable of increasing the back focal distance of the objective optical system, but has the problem that the total length of the objective optical system becomes large and thus the thickness of the camera cannot be decreased.

SUMMARY OF THE INVENTION

It is, therefore, an object of the present invention to provide a real image mode variable magnification finder which has an objective optical system whose back focal distance is long and whose total length is short, rarely allows the penetration of dirt particles although diopter-adjustable, undergoes little change in performance, and is small in size.

In order to accomplish this object, according to the present invention, the real image mode variable magnification finder includes an objective optical system with positive refracting power, an image erecting optical system, and an ocular optical system with positive refracting power. The objective optical system has a first lens unit with negative refracting power, a second lens unit with negative refracting power, a third lens unit with positive refracting power, and a fourth lens unit with negative refracting power, and is designed so that when the magnification of the finder is changed, at least one lens unit, namely the third lens unit is moved.

Further, according to the present invention, the real image mode variable magnification finder is constructed so that the image erecting optical system includes a prism and the fourth lens unit with negative refracting power is configured to be integral with the entrance surface of the prism.

Still further, according to the present invention, the real image mode variable magnification finder includes an objective optical system with positive refracting power, an image erecting optical sytem, and an ocular optical system with positive refracting power. The image erecting optical system is composed of a prism and a mirror, and the ocular optical system is provided with at least two lenses, that is, a fixed lens and a moving lens.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 1A and 1B are views showing cases where different, conventional real image mode variable magnification finders are incorporated in cameras;

FIG. 2 is a view for explaining the reflection of light caused by a prism used as a reflecting member on the ocular optical system side;

FIG. 4 is a perspective view showing the configuration of a Porro prism used in the real image mode variable magnification finder of the present invention;

FIGS. 8A, 8B, and 8C are sectional views showing arrangements, each developed along the optical axis, at wide-angle, middle, and telephoto positions, respectively, of the real image mode variable magnification finder of a second embodiment in the present invention; and FIGS. 9A, 9B, and 9C are sectional views showing arrangements, each developed along the optical axis, at wide-angle, middle, and telephoto positions, respectively, of the real image mode variable magnification finder of a third embodiment in the present invention.

DETAILED DESCRIPTION OF THE PREFERRED EMBODIMENTS

Figure 3A:
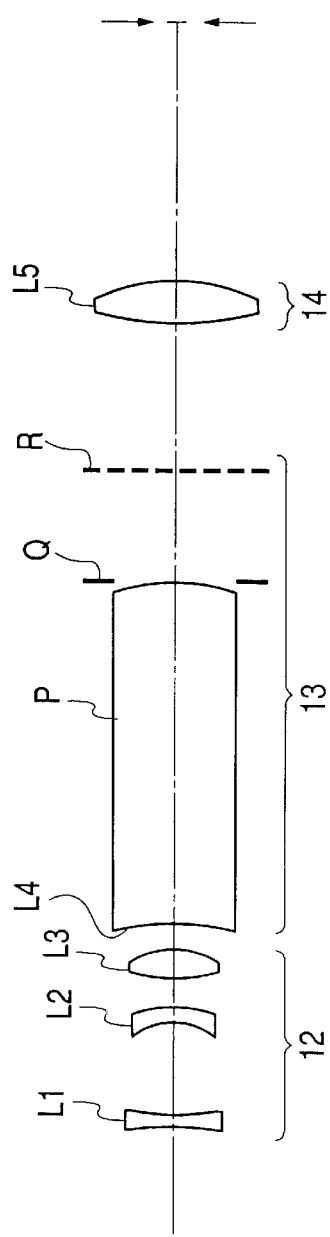
FIGS. 3A, 3B, and 3C are sectional views showing arrangements, each developed along the optical axis, at wide-angle, middle, and telephoto positions, respectively, of the real image mode variable magnification finder of a first embodiment in the present invention.

Before undertaking the explanation of the embodiments, a description will be given of the general function of the real image mode variable magnification finder according to the present invention.

For the objective optical system of the real image mode variable magnification finder, it is necessary to improve a retrofocus property and strengthen a forward negative power in order to obtain a back focal distance as long as possible. In the present invention, since the forward negative power is shared between the first and second lens units, one lens unit need not have a higher power than is necessary, and thus curvature of field and distortion can be minimized. Divergent light emerging from the second lens unit is collected by the third lens unit with positive power. The fourth lens unit with negative power, located behind it, has two effects. One of these is that the back focal distance can be increased by the diverging action of the fourth lens unit. The other is that the pupil position of the objective optical system is shifted forward, and the diameter of a front lens can be diminished.

The magnification of the finder is changed by chiefly moving the third lens unit. Specifically, the third lens unit is moved from the intermediate image side to the object side and thereby the magnification is changed from low to high.

The fourth lens unit may be constructed with a single lens. However, in order to further reduce the total length of the objective optical system, it is desirable that the entrance surface of a three-reflection prism located in the back focus section of the objective optical system is configured as a concave surface to thereby possess a negative power so that the number of members is reduced. In this case, it is favorable that an Abbe's number vp satisfies the following condition:

$$\nu p < 50 \quad (1)$$

When Condition (1) is satisfied, axial chromatic aberration can be favorably corrected. Also, even though Condition (1) is not satisfied, there is little problem in practical use.

If aspherical surfaces are used in at least one lens unit, that is, the third lens unit, spherical aberration and coma can be favorably corrected even when the lens unit is a single lens.

In order to correct diopters varying with variable magnification, it is desirable to change the distance between the first lens unit and the second lens unit. In this case, either the first lens unit or the second lens unit, or both, may be moved. It is, of course, favorable that the number of moving lens units is made as small as possible, because a lens movement mechanism is simplified. Also, if the variable magnification ratio is low, the diopter will undergo little change, and thus there is no problem in practical use even when only the third lens unit is moved.

Further, it is favorable that the finder satisfies the following condition:

$$0.5 < L_{pr}/L_{obj} < 0.7 \quad (2)$$

where $L_{pr}$ is the optical path length of the prism and $L_{obj}$ is the maximum optical path length of the objective optical system (a distance, measured along the optical axis, from the entrance surface of the first lens unit to the intermediate image).

If the lower limit of Condition (2) is passed, the total length of the objective optical system will be increased, and hence the thickness of the camera cannot be reduced. Beyond the upper limit, aberration is deteriorated because the power of each lens unit is strengthened.

Subsequently, reference is made to another function of the present invention. The back focus section of the objective optical system is provided with the three-reflection prism for erecting an image. The intermediate image of the objective optical system is formed in the vicinity of the exit surface of the prism, where a field frame is placed. Light incident on the prism from the objective optical system is reflected upward and then back by the reflecting surfaces of the prism and is further reflected laterally by the third reflecting surface. In this way, the intermediate image is formed in a plane nearly parallel with the axis of incident light from the objective optical system. In order to further erect the image, the image needs to be once-reflected between the intermediate image and the ocular optical system. The optical path length from the intermediate image to the ocular optical system becomes nearly equivalent to the focal length of the ocular optical system. If a prism is used as a reflecting member on the ocular optical system side, it will have the total length for more than one reflection, and a width W of the prism becomes large, with a resulting increase in camera width (refer to FIG. 2). Thus, the present invention uses a one-reflection mirror.

In order to prevent the adhesion of dirt particles to optical components situated in the vicinity of the intermediate image, notably, to the exit surface of the prism, an enclosed structure is required. Moreover, for diopter adjustment, it is necessary to move the eyepiece along the optical axis.

Thus, in the present invention, the ocular optical system is constructed with at least two lenses, one fixed, lying on the intermediate image side and the other moved for diopter adjustment, lying on the pupil side. Consequently, the enclosed structure can be provided, extending from the exit surface of the prism, through the field frame and the mirror, to the fixed lens. In this case, it is desirable that the ocular optical system satisfies the following condition:

$$|f_{R2}/f_{R1}| < 0.5 \quad (3)$$

where $f_{R1}$ is the focal length of one lens on the objective optical system side, of two lenses constituting the ocular optical system and $f_{R2}$ is the focal length of the other lens on the pupil side. If the upper limit of Condition (3) is passed, the variation of spherical aberration caused by the lens movement for diopter adjustment becomes considerable, which is unfavorable.

The entrance surface of the prism, as mentioned above, may have a negative power to serve as a part of the objective optical system. Furthermore, the exit surface of the prism may be configured as a convex surface to play the role of a field lens. Since the member of the field frame is located above the side face of the objective optical system, the height of the camera is not increased even when a mechanism member for changing the size of the field frame is placed.

In accordance with the drawings, the embodiments of the present invention will be explained below.

FIRST EMBODIMENT

Figure 3B:
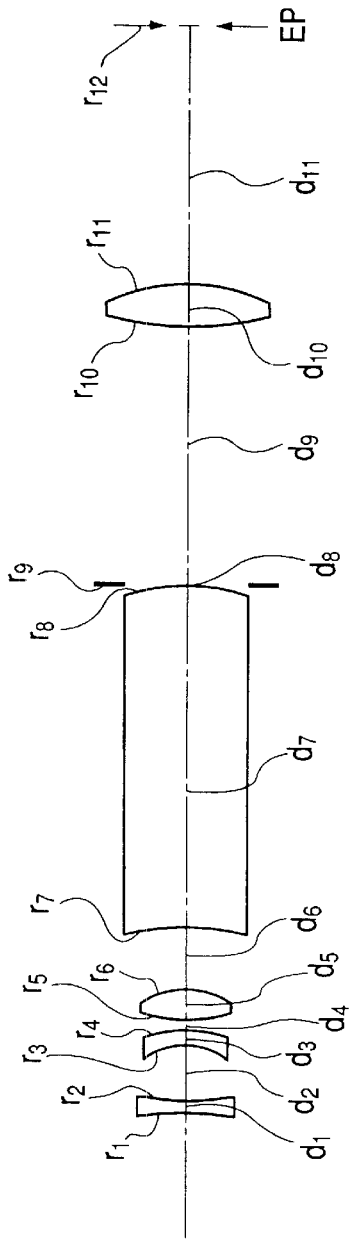
Figure 3C:
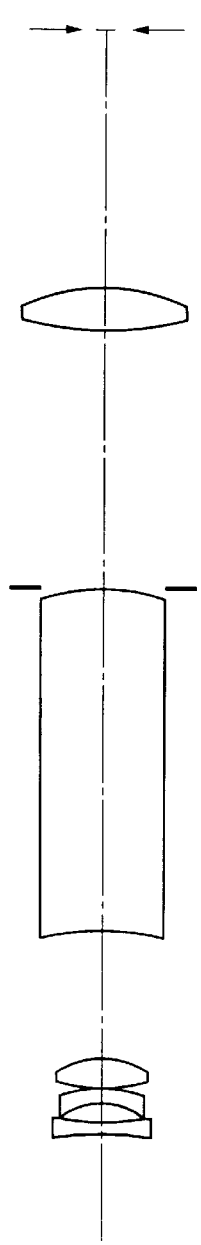
Figure 5A:
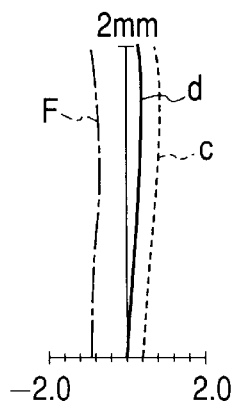
FIGS. 5A, 5B, and 5C are diagrams showing aberration characteristics at the wide-angle position of the finder in the first embodiment.
Figure 5B:
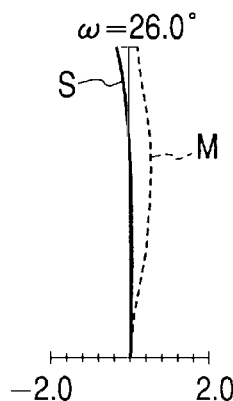
Figure 5C:
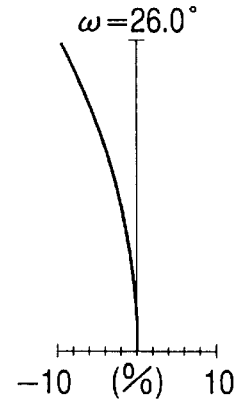
Figure 6A:
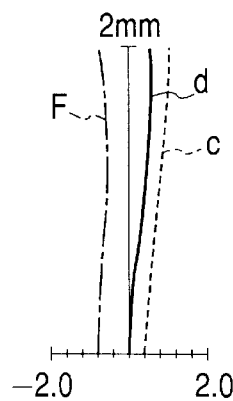
FIGS. 6A, 6B, and 6C are diagrams showing aberration characteristics at the middle position of the finder in the first embodiment.
Figure 6B:
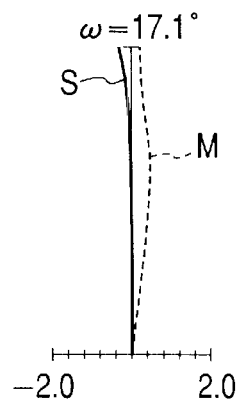
Figure 6C:
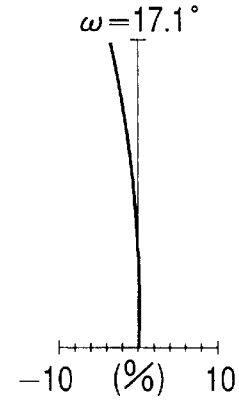
Figure 7A:
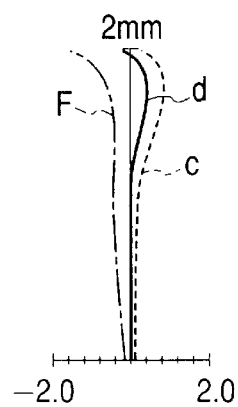
FIGS. 7A, 7B, and 7C are diagrams showing aberration characteristics at the telephoto position of the finder in the first embodiment.
Figure 7B:
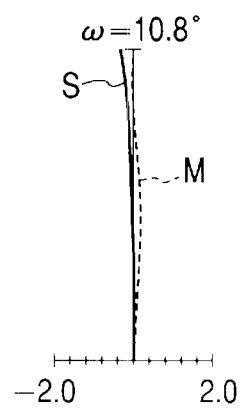
Figure 7C:
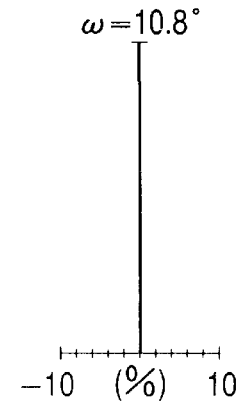

In FIGS. 3A, 3B, and 3C, an objective optical system 12 in this embodiment includes a first lens unit $L_1$ with negative refracting power, having concave surfaces on the object side and the pupil side; a second lens unit $L_2$ of a meniscus lens with negative refracting power, directing concave surfaces toward the object side; a third lens unit $L_3$ with positive refracting power, having convex surfaces on both sides; and a fourth lens unit $L_4$ with negative refracting power, having a concave surface configured as the entrance surface of a three-reflection prism P. An image erecting optical system 13, as shown in FIG. 4, is constructed with the three-reflection prism P, in which a field frame Q is placed so as to come in contact with the exit surface thereof. A mirror R for reflecting incident light is located so that the axis of light emerging from the mirror R becomes parallel with that of light incident on the prism P. An ocular optical system 14 is constructed with an eyepiece $L_5$ with positive refracting power, having convex surfaces on both sides.

When a change of the magnification of the finder is made from the wide-angle position to the telephoto position, the third lens unit $L_3$ is simply moved toward the object side, and the first and second lens units $L_1$ and $L_2$ are moved along the optical axis for diopter adjustment involved in the change of the magnification. Also, each of the first, second, and third lens units is constructed with a single lens.

In the first embodiment, since the diopter adjustment is not made with respect to an observer's eye, the ocular optical system 14 has a single fixed lens $L_5$ to hermetically seal an intermediate image section.

The surfaces of individual optical components, in order from the object side, are labeled $r_1$–$r_{11}$ in FIG. 3B. Aspherical surfaces are used for a surface $r_2$ on the pupil side of the first lens unit $L_1$, a surface $r_3$ on the object side of the second lens unit $L_2$, both surfaces $r_5$ and $r_6$ of the third lens unit $L_3$, and a surface $r_{11}$ on the pupil side of the eyepiece $L_5$.

In the present invention, since the exit surface of the three-reflection prism P is configured to be convex and is also used as the field lens, the number of parts can be reduced. Also, although in the present invention the entrance surface of the three-reflection prism P is shaped into a concave form and is used as the fourth lens unit of the objective optical system 12, it may be constructed as an independent lens with negative refracting power.

Subsequently, numerical data of the first embodiment are shown below. Also, aberration characteristics of the optical system of the finder in the first embodiment are as shown in FIGS. 5A–5C, 6A–6C, and 7A–7C.

In the numerical data, ω is a half angle of view of emergence (°); EP is an eyepoint; m is a finder magnification; $r_1, r_2, \ldots$ are radii of curvature (mm) of individual lens and prism surfaces; $d_1, d_2, \ldots$ are distances (mm) between individual surfaces; $n_1, n_2, \ldots$ are refractive indices of individual lenses and prisms in the d line; $v_1, v_2, \ldots$ are Abbe's number of individual lenses and prisms; r is a paraxial radius of curvature; k is a conic constant; and $A_4$, $A_6$, $A_8$, and $A_{10}$ are aspherical coefficients of the fourth, sixth, eighth, and tenth orders, respectively. These symbols are applied to all the embodiments.

Also, the configuration of each of the aspherical surfaces is given by the following equation:

$$x=(y^2/r)/[1+\{1-(1+k)(y/r)^2\}^{1/2}]+A_4 y^4+A_6 y^6+A_8 y^8+A_{10} y^{10}$$

where x is the coordinate in the direction of the optical axis and y is the coordinate in the direction normal to the optical axis.

Magnification (m) 0.43×(wide-angle)–0.64×(middle)–1.00× (telephoto)
Half angle of view (ω) 26.0° (wide-angle)–17.1° (middle)–10.8° (telephoto)
Pupil diamater ϕ 4 mm
$r_1$=–22.013
  $d_1$=0.800 $n_1$=1.58423 $v_1$=30.49
$r_2$=12.273
  $d_2$=6.150 (wide-angle), 3.482 (middle), 1.231 (telephoto)
$r_3$=–3.597
  $d_3$=1.147 $n_3$=1.58423 $v_3$=30.49
$r_4$=–9.743
  $d_4$=1.844 (wide-angle), 0.924 (middle), 0.200 (telephoto)
$r_5$=7.775
  $d_5$=2.043 $n_5$=1.52542 $v_5$=55.78
$r_6$=–4.613
  $d_6$=1.716 (wide-angle), 4.190 (middle), 8.278 (telephoto)
$r_7$=–17.007
  $d_7$=23.900 $n_7$=1.52542 $v_7$=55.78
$r_8$=–14.423
  $d_8$=0.000
$r_9$=∞
  $d_9$=18.000
$r_{10}$=28.036
  $d_{10}$=2.600 $n_{10}$=1.49241 $v_{10}$=57.66
$r_{11}$=–14.005
  $d_{11}$=18.500
$r_{12}$=(EP)
Aspherical coefficients
Second surface
  r=12.275, k=–1.02222
  $A_4$=–2.89549×10$^{-4}$, $A_6$=–5.06179×10$^{-5}$,
  $A_8$=3.39356×10$^{-6}$, $A_{10}$=0.00000
Third surface
  r=–3.597, k=–1.19309
  $A_4$=–2.50359×10$^{-3}$, $A_6$=–3.43509×10$^{-4}$,
  $a_8$=2.66297×10$^{-5}$, $A_{10}$=–3.31788×10$^{-6}$
Fifth surface
  r=7.775, k=–13.22244
  $A_4$=9.85901×10$^{-4}$, $A_6$=–6.07753×10$^{-5}$,
  $A_8$=–1.42148×10$^{-6}$, $A_{10}$=5.49069×10$^{-8}$
Sixth surface
  r=–4.613, k=–0.28412
  $A_4$=5.47072×10$^{-4}$, $A_6$=6.94534×10$^{-5}$,
  $A_8$=–4.73049×10$^{-6}$, $A_{10}$=0.00000
Eleventh surface
  r=–14.005, k=–3.60103
  $A_4$=–4.86880×10$^{-5}$, $A_6$=–2.05766×10$^{-6}$,
  $A_8$=1.08973×10$^{-7}$, $A_{10}$=–1.73226×10$^{-9}$
Values of parameters shown in Conditions (1) and (2)
Condition (1): vp=55.78
Condition (2): $L_{obj}$=37.6 mm, $L_{pr}$=23.9 mm, $L_{pr}/L_{obj}$=0.636

SECOND EMBODIMENT

The second embodiment is explained with reference to FIGS. 8A, 8B, and 8C. This embodiment has the same arrangement as the first embodiment with the exception that when the magnification is changed, the second and third lens units are moved. Since the first lens unit is fixed and the number of moving lens units is reduced, a variable magnification mechanism can be simplified.

Subsequently, numerical data of the second embodiment are shown below.
Magnification (m) 0.43×(wide-angle)–0.64×(middle)–1.00× (telephoto)
Half angle of view (ω) 25.6° (wide-angle)–16.7° (middle)–10.4° (telephoto)

pupil diameter φ4 mm $r_1 = -68.520$
  $d_1 = 0.800$ $n_1 = 1.58423$ $v_1 = 30.49$
$r_2 = 15.062$
  $d_2 = 3.232$ (wide-angle), 3.555 (middle), 1.069 (telephoto)
$r_3 = -6.164$
  $d_3 = 1.041$ $n_3 = 1.58423$ $v_3 = 30.49$
$r_4 = -18.904$
  $d_4 = 5.729$ (wide-angle), 2.449 (middle), 0.800 (telephoto)
$r_5 = 9.585$
  $d_5 = 2.097$ $n_5 = 1.52542$ $v_5 = 55.78$
$r_6 = -6.269$
  $d_6 = 0.800$ (wide-angle), 3.757 (middle), 7.893 (telephoto)
$r_7 = -27.823$
  $d_7 = 23.900$ $n_7 = 1.52542$ $v_7 = 55.78$
$r_8 = -17.083$
  $d_8 = 0.000$
$r_9 = \infty$
  $d_9 = 18.000$
$r_{10} = 217.193$
  $d_{10} = 2.600$ $n_{10} = 1.49241$ $v_{10} = 57.66$
$r_{11} = -10.197$
  $d_{11} = 18.500$
$r_{12} = (EP)$ Aspherical coefficients
Second surface
  $r = 15.062$, $k = -0.64061$
  $A_4 = -3.00125 \times 10^{-4}$, $A_6 = -5.16751 \times 10^{-5}$,
  $A_8 = 2.18066 \times 10^{-6}$, $A_{10} = 0.00000$
Third surface
  $r = -6.164$, $k = -1.21250$
  $A_4 = -6.73166 \times 10^{-4}$, $A_6 = -2.42596 \times 10^{-5}$,
  $A_8 = -1.39647 \times 10^{-5}$, $A_{10} = 9.10282 \times 10^{-7}$
Fifth surface
  $r = 9.585$, $k = -9.47791$
  $A_4 = 4.12329 \times 10^{-4}$, $A_6 = -5.34777 \times 10^{-5}$,
  $A_8 = 2.91441 \times 10^{-6}$, $A_{10} = -6.22966 \times 10^{-8}$
Sixth surface
  $r = -6.269$, $k = -0.07796$
  $A_4 = 4.64493 \times 10^{-4}$, $A_6 = -1.57600 \times 10^{-5}$,
  $A_8 = 6.72748 \times 10^{-7}$, $A_{10} = 0.00000$
Eleventh surface
  $r = -10.197$, $k = -1.66633$
  $A_4 = -8.32536 \times 10^{-5}$, $A_6 = 1.55257 \times 10^{-6}$,
  $A_8 = -4.32080 \times 10^{-8}$, $A_{10} = 3.99884 \times 10^{-10}$ Values of parameters shown in Condition (1) and (2)
  Condition (1): $v_p = 55.78$
  Condition (2): $L_{obj} = 37.599$ mm, $L_{pr} = 23.9$ mm, $L_{pr}/L_{obj} = 0.636$

THIRD EMBODIMENT

The third embodiment is explained with reference to FIGS. 9A, 9B, and 9C. The objective optical system 12 in this embodiment, unlike those in the first and second embodiments, includes the first lens unit $L_1$ with negative refracting power, having a convex surface on the object side and a concave surface on the pupil side; the second lens unit $L_2$ of a meniscus lens with negative refracting power, having a concave surface on the object side and a convex surface on the pupil side; the third lens unit $L_3$ with positive refracting power, having convex surfaces on both sides; and the fourth lens unit $L_4$ having a concave surface directed toward the object side, configured as the entrance surface of the three-reflection prism P. The image erecting optical system 13 has the same arrangement as in the first embodiment. The ocular optical system 14, unlike those of the first and second embodiments, is constructed with a fixed lens $L_6$ having a concave surface on the object side and a moving lens $L_7$ having convex surfaces on both sides. The fixed lens $L_6$ is designed so that the intermediate image section is hermetically sealed to prevent the adhesion of dirt particles to the exit surface of the prism P. In the third embodiment, aspherical surfaces are used for a surface $r_2$ on the pupil side of the first lens unit $L_1$, a surface $r_3$ on the object side of the second lens unit $L_2$, both surfaces $r_5$ and $r_6$ of the third lens unit $L_3$, and a surface $r_{13}$ on the pupil side of the moving lens $L_7$.

In the third embodiment, materials that satisfy Condition (1) are used and thus axial chromatic aberration is favorably corrected.

Subsequently, numerical data of the third embodiment are shown below.

Magnification (m) 0.43× (wide-angle)–0.64× (middle)–0.99× (telephoto)
Half angle of view (ω) 25.8° (wide-angle)–16.9° (middle)–10.8° (telephoto)
Pupil diameter φ 4 mm $r_1 = 9.543$
  $d_1 = 0.800$ $n_1 = 1.58423$ $v_1 = 30.49$
$r_2 = 4.794$
  $d_2 = 1.578$ (wide-angle), 2.622 (middle), 1.816 (telephoto)
$r_3 = -7.169$
  $d_3 = 0.800$ $n_3 = 1.58423$ $v_3 = 30.49$
$r_4 = -16.728$
  $d_4 = 7.512$ (wide-angle), 3.193 (middle), 0.800 (telephoto)
$r_5 = 6.681$
  $d_5 = 2.710$ $n_5 = 1.49241$ $v_5 = 57.66$
$r_6 = -7.381$
  $d_6 = 0.800$ (wide-angle), 3.374 (middle), 7.272 (telephoto)
$r_7 = -24.314$
  $d_7 = 22.900$ $n_7 = 1.58423$ $v_7 = 30.49$
$r_8 = -17.977$
  $d_8 = 0.000$
$r_9 = \infty$
  $d_9 = 15.200$
$r_{10} = -42.007$
  $d_{10} = 0.800$ $n_{10} = 1.58423$ $v_{10} = 30.49$
$r_{11} = \infty$
  $d_{11}$ = variable (fixed in magnification change)
$r_{12} = 34.838$
  $d_{12} = 2.600$ $n_{12} = 1.49241$ $v_{12} = 57.66$
$r_{13} = -9.980$
  $d_{13}$ = variable (fixed in magnification change)
$r_{14} = (EP)$ Aspherical coefficients
Second surface
  $r = 4.794$, $k = 1.22930$
  $A_4 = -6.62879 \times 10^{-4}$, $A_6 = -9.53119 \times 10^{-5}$,
  $A_8 = 3.35102 \times 10^{-5}$, $A_{10} = 0.00000$
Third surface
  $r = -7.169$, $k = 1.43673$
  $A_4 = 1.68122 \times 10^{-3}$, $A_6 = 1.66187 \times 10^{-4}$, $A_8=-1.92425\times10^{-5}$, $A_{10}=6.11812\times10^{-6}$ Fifth surface $r=6.681$, $k=-0.29920$ $A_4=-2.41385\times10^{-4}$, $A_6=1.06721\times10^{-4}$, $A_8=3.58275\times10^{-6}$, $A_{10}=-1.74078\times10^{-7}$ Sixth surface $r=-7.381$, $k=-1.52416$ $A_4=8.10006\times10^{-4}$, $A_6=5.81412\times10^{-5}$, $A_8=9.43870\times10^{-6}$, $A_{10}=0.00000$ Thirteenth surface $r=-9.980$, $k=-5.25419$ $A_4=-5.08607\times10^{-4}$, $A_6=1.10983\times10^{-5}$, $A_8=-2.33686\times10^{-7}$, $A_{10}=2.69264\times10^{-9}$ Values of parameters shown in Conditions (1), (2), and (3)

Condition (1): $\nu p=30.49$

Condition (2): $L_{obj}=37.1$ mm, $L_{pr}=22.9$ mm, $L_{pr}/L_{obj}=0.617$

Condition (3): $f_{r1}=-71.9$, $f_{R2}=16.0$, $|f_{R2}/f_{R1}|=0.223$.

What is claimed is:

1. A real image mode variable magnification finder, comprising:

an objective optical system having positive refracting power;

an image erecting optical system; and an ocular optical system having positive refracting power, said objective optical system having, in order from an object side, a first lens unit with negative refracting power, a second lens unit with negative refracting power, a third lens unit with positive refracting power, and a fourth lens unit with negative refracting power, wherein, when a magnification of said finder is changed, a plurality of lens units including said third lens unit are moved, a distance between said second lens unit and said third lens unit is changed so as to be shorter in an intermediate position than in a wide-angle position and much shorter in a telephoto position than in the intermediate position, and a distance between said first lens unit and said second lens unit is changed so as to be shorter in the intermediate position than in the wide-angle position and to be much shorter in the telephoto position than in the intermediate position.

2. A real image mode variable magnification finder according to claim 1, wherein said image erecting optical system includes a prism, and said fourth lens unit with negative refracting power is constructed to be integral with an entrance surface of said prism.

3. A real image mode variable magnification finder according to claim 2, wherein said prism has first and second reflecting surfaces that are arranged such that an axis of reflected light from said second reflecting surface is positioned substantially above an axis of incident light on said prism and a third reflecting surface constructed and arranged to orient an axis of reflected light from said third reflecting surface in a direction substantially perpendicular to the axis of incident light on said prism.

4. A real image mode variable magnification finder according to claim 2, wherein said prism satisfies the following condition:

$$\nu_p<50$$

where $\nu_p$ is an Abbe's number of said prism.

5. A real image mode variable magnification finder according to claim 2, wherein at least one lens unit including said third lens unit has aspherical surfaces.

6. A real image mode variable magnification finder according to claim 2, wherein when the magnification is changed, a distance between said third lens unit and said fourth lens unit is changed.

7. A real image mode variable magnification finder according to claim 6, wherein while the magnification of said finder is changed from a wide-angle position to a telephoto position, said third lens unit is moved solely toward an object side.

8. A real image mode variable magnification finder according to claim 7, wherein said prism satisfies the following condition:

$$0.5<L_{pr}/L_{obj}<0.7$$

where $L_{pr}$ is an optical path length of said prism and $L_{obj}$ is a maximum optical path length of said objective optical system, that is, a distance, measured along an optical axis, from an entrance surface of said first lens unit to an intermediate image.

9. A real image mode variable magnification finder according to claim 8, wherein said prism satisfies the following condition:

$$0.617<L_{pr}/L_{obj}<0.7.$$

10. A real image mode variable magnification finder according to claim 1, wherein at least one lens unit including said third lens unit has aspherical surfaces.

11. A real image mode variable magnification finder according to claim 1, wherein, when the magnification is changed, a distance between said third lens unit and said fourth lens unit is changed.

12. A real image mode variable magnification finder according to claim 11, wherein, while the magnification of said finder is changed from a wide-angle position to a telephoto position, said third lens unit is moved solely toward an object side.

13. A real image mode variable magnification finder comprising:

an objective optical system having positive refracting power;

an image erecting optical system; and an ocular optical system having positive refracting power, said objective optical system having, in order from an object side, a first lens unit with negative refracting power, a second lens unit with negative refracting power, a third lens unit with positive refracting power, and a fourth lens unit with negative refracting power, wherein said first lens unit includes a negative meniscus lens, said second lens unit includes a negative meniscus lens, and an object-side surface of said negative meniscus lens of said first lens unit has a larger absolute value of radius of curvature than an object-side surface of said negative meniscus lens of said second lens unit, and wherein when a magnification of said finder is changed, a plurality of lens units including said third lens unit are moved, a distance between said second lens unit and said third lens unit is changed, and a distance between said first lens unit and said second lens unit is changed.

* * * * *